(12) United States Patent
Shih et al.

(10) Patent No.: US 9,614,579 B2
(45) Date of Patent: Apr. 4, 2017

(54) TECHNIQUES FOR GENERATION OF A FREQUENCY HOPPING SEQUENCE

(71) Applicant: Texas Instruments Incorporated, Dallas, TX (US)

(72) Inventors: Chao-Fang Shih, Smyrna, GA (US); Ariton E. Xhafa, Plano, TX (US); Jianwei Zhou, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

(21) Appl. No.: 14/813,093

(22) Filed: Jul. 29, 2015

(65) Prior Publication Data
US 2016/0072548 A1    Mar. 10, 2016

Related U.S. Application Data (60) Provisional application No. 62/048,692, filed on Sep. 10, 2014.

(51) Int. Cl.
*H04B 1/7143* (2011.01)
*H04B 1/715* (2011.01)

(52) U.S. Cl.
CPC ........... *H04B 1/7143* (2013.01); *H04B 1/715* (2013.01); *H04B 2001/7154* (2013.01)

(58) Field of Classification Search
CPC .................. H04B 1/7143; H04B 1/715; H04B 2001/7154
See application file for complete search history.

(56) References Cited

PUBLICATIONS

Chao-Fang Shih; Xhafa, A.E.; Jianwei Zhou, "Practical frequency hopping sequence design for interference avoidance in 802.15.4e TSCH networks," in Communications (ICC), 2015 IEEE International Conference on , vol., No., pp. 6494-6499, Jun. 8-12, 2015.*
Peng Du and George Roussos, "Spectrum-Aware Wireless Sensor Networks", 2013 IEEE International Symposium on Personal, Indoor and Mobile Radio Communications: Mobile and Wireless Networks, pp. 2321-2325.
"Part 15.4: Low-Rate Wireless Personal Area Networks (LR-WPANs), Amendment 1:MAC sublayer", IEEE Standard for Local and Metropolitan Area Networks, IEEE Std 802.15.4e-2012, IEEE Computer Society, Apr. 16, 2012, pp. 1-225.
"Part 15.4: Low-Rate Wireless Personal Area Networks (LR-WPANs)", IEEE Standard for Local and Metropolitan Area Networks, IEEE Std 802.15A-2011, IEEE Computer Society, Sep. 5, 2011 pp. 1-314.

(Continued)

*Primary Examiner* — Jaison Joseph
(74) *Attorney, Agent, or Firm* — Kenneth Liu; Charles A. Brill; Frank D. Cimino (57) ABSTRACT

A device operated in a network using a channel hopping communication protocol may select a channel for each transmission by first generating and storing a sequence of pseudo-random index numbers. A list of good channels is selected from a plurality of channels. For each channel hop, one of the good channels is selected from the list of good channels for use by a transceiver in the device by using an index number selected from the sequence of pseudo-random index numbers. The list of good channels may be revised periodically and channels may be selected from the list of good channels for use by the transceiver without revising the sequence of pseudo-random index numbers.

19 Claims, 3 Drawing Sheets

(56) References Cited

PUBLICATIONS

Abraham Lempel and Haim Greenberger, "Families of Sequences with Optimal Hamming Correlation Properties", IEEE Transactions on Information Theory, vol. IT-20, No. 1, Jan. 1974, pp. 90-94.
"CC2650 SimpleLink Multistandard Wireless MCU", CC2650, Texas Instruments Inc., SWRS158—Feb. 2015, pp. 1-52.

* cited by examiner

TECHNIQUES FOR GENERATION OF A FREQUENCY HOPPING SEQUENCE

CLAIM OF PRIORITY UNDER 35 U.S.C. 119(e)

The present application claims priority to and incorporates by reference U.S. Provisional Application No. 62/048,692, filed Sep. 10, 2014, entitled "Frequency Hopping Sequence Generation with Low Computational Overhead".

FIELD OF THE INVENTION

This invention generally relates to wireless personal area networks, and more particularly to frequency hopping techniques in a multi-channel wireless network protocol.

BACKGROUND OF THE INVENTION

IEEE 802.15.4e is an enhanced MAC (media access control) layer protocol of 802.15.4 designed for low power and low rate networks. It is suitable for sensor devices with resource constraints; e.g., low power consumption, low computation capabilities, and low memory. Time-Slotted Channel Hopping (TSCH) is a MAC mechanism in IEEE 802.15.4e networks. In TSCH, time is divided into time slots, and every device is time-synchronized to a root node in the network and uses the time slots to communicate/synchronize in the network. The device hops among all channels according to a frequency hopping sequence (FHS) during the time slots. TSCH can achieve higher capacity and provides finer granularity for power savings in IEEE 802.15.4e networks.

Wireless personal area networks (WPANs) may be used to convey information over relatively short distances. Unlike wireless local area networks (WLANs), connections effected via WPANs involve little or no infrastructure. This feature allows small, power-efficient, inexpensive solutions to be implemented for a wide range of devices. Two different device types can participate in an IEEE 802.15.4 network: a full-function device (FFD) and a reduced-function device (RFD). An FFD is a device that is capable of serving as a personal area network (PAN) coordinator. An RFD is a device that is not capable of serving as a PAN coordinator. An RFD is intended for applications that are extremely simple, such as a light switch or a passive infrared sensor; it does not have the need to send large amounts of data and only associates with a single FFD at a time. Consequently, the RFD can be implemented using minimal resources and memory capacity.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

IEEE 802.15.4e is an enhanced MAC (media access control) layer protocol of 802.15.4 designed for low power and low rate networks. It is suitable for sensor devices with resource constraints; e.g., low power consumption, low computation capabilities, and low memory. As sensors and actuators that are interconnected by a personal area network (PAN) in home and office environments become more common, limiting power dissipation of each device is important. Some devices may operate on a battery, in which case frequent battery changes are undesirable. Some devices may operate on a limited amount of power that is generated by the device itself using various means, such as: conversion from solar or other light sources, scavenging from motion or thermal effects, collection of energy from ambient electromagnet fields, etc. At the same time, devices may have limited memory and computation capabilities, which means algorithms with high computational complexity may not be tolerable.

Time-Slotted Channel Hopping (TSCH) is a MAC mechanism in IEEE 802.15.4e networks. In TSCH, time is divided into time slots, and every device is time-synchronized to a root node in the network and uses the time slots to communicate/synchronize in the network. A typical IEEE 802.15.4e network may utilize 1.2 second frames that are divided into 10 ms slots, for example. Each device may hop among all available channels according to a frequency hopping sequence (FHS) during the time slots. TSCH may achieve higher capacity and provides finer granularity for power savings in IEEE 802.15.4e networks. Devices may transit into a low power sleep mode when they are not active in order to conserve power.

Power consumption is an important issue for sensor devices that use IEEE 802.15.4e technology. The power consumption of these devices increases when interference in 2.4 GHz band increases, because packet retransmissions are increased. In some scenarios it can be as high as 3× comparing to the power consumption when there is no interference.

In order to avoid the power consumption due to interference, TSCH with channel blacklisting has been proposed for IEEE 802.15.4e based networks; see e.g., P. Du and G. Roussos, "Spectrum-Aware Wireless Sensor Networks," IEEE 24th International Symposium on Personal, Indoor and Mobile Radio Communication (PIMRC) 2013, which is incorporated by reference herein and referred to as "P. Du". Channel blacklisting may be an efficient way to decrease the power consumption due to interference by temporarily avoiding the use of channels that are observed to be heavily interfered. Since some channels are "blacklisted", blacklisting changes the number of channels available for use. This value is called "channel-number," "channel$_N$," or "N" in the following disclosure. Since the channel-number is changed, the original FHS cannot be used, and devices need to regenerate a new FHS every time the channel blacklist (i.e., the channel list that the device should not use) is updated. Generating a new FHS requires computation effort that is proportional to L, where L is the length of the FHS. Since L is usually a large number to ensure randomness (L=511 in the default FHS), the regeneration of FHS introduces large computational overhead in each sensor device in the network.

Since sensor devices have limited resources, a more efficient way to select channels for frequency hopping in response to blacklisting is disclosed herein. This technique avoids the overhead of regenerating the FHS by each leaf node each time the channel-number changes in response to blacklisting while still maintaining the desirable random properties of the default FHS to minimize interference between links. In this technique, channels are selected with different channel-numbers using only one initially generated generic sequence, as will be described in more detail below.

Figure 1:
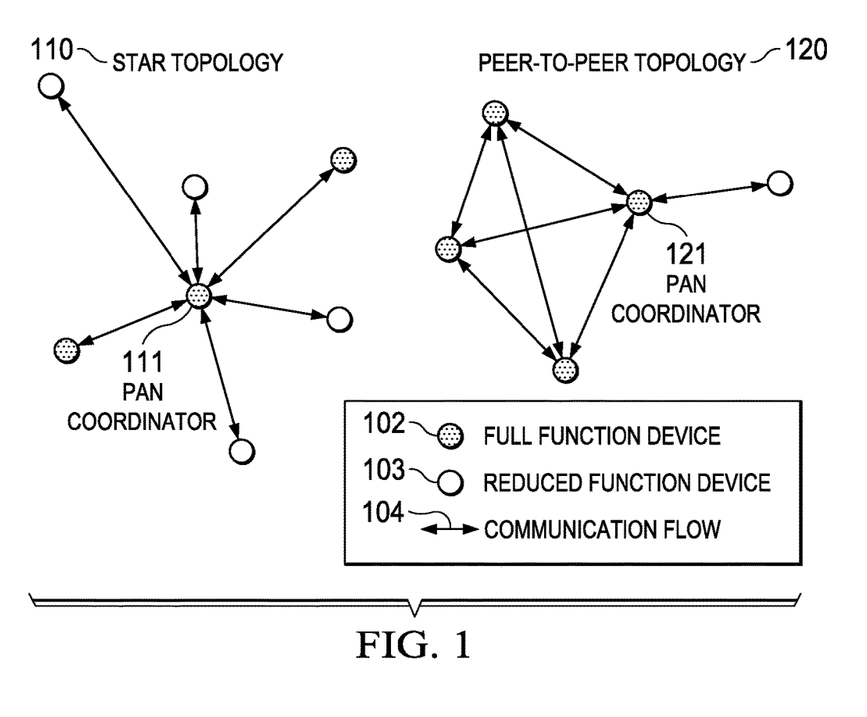
FIG. 1 includes illustrations of example personnel area networks.

FIG. 1 includes illustrations of two types of example personal area networks, a star topology 110 and a peer to peer topology 120. Both types may coexist in a home or office, for example. In this example, full function devices (FFD) 102 are represented by a solid circle and reduced function devices (RFD) 103 are represented by an open circle. Device to device communication paths are represented by arrows 104. As mentioned earlier, IEEE 802.15.4e is an enhanced MAC layer protocol of 802.15.4 designed for low power and low rate networks. The general operation of IEEE 802.15.4 and IEEE 802.15.4e is well known and will not be described in detail herein; however, a brief description of the operation of IEEE 802.15.4e is provided below. A more detailed description may be found in the IEEE standards documents. IEEE Std. 802.15.4TM-2011, "Low-Rate Wireless Personal Area Networks (LR-WPANs)" is incorporated by reference herein. Likewise, IEEE Std. 802.15.4eTM-2012, "Low-Rate Wireless Personal Area Networks (LR-WPANs) Amendment 1: MAC sublayer" is incorporated by reference herein.

The IEEE 802.15.4e architecture is defined in terms of a number of blocks in order to simplify the standard. These blocks are called layers. Each layer is responsible for one part of the standard and offers services to the higher layers. The interfaces between the layers serve to define the logical links that are described in the standard. An LR-WPAN device comprises at least one PHY (physical layer), which contains the radio frequency (RF) transceiver along with its low-level control mechanism, and a MAC (medium access control) sublayer that provides access to the physical channel for all types of transfer.

Depending on the application requirements, an IEEE 802.15.4e LR-WPAN may operate in either of two topologies: the star topology 110 or the peer-to-peer topology 120. Both are illustrated in FIG. 1. In the star topology, the communication is established between devices and a single central controller, called the PAN coordinator 111. Pan coordinator 111 may also be called the root node, for example. The other devices in the PAN may be referred to as leaf nodes, for example. A device typically has some associated application and is either the initiation point or the termination point for network communications. A PAN coordinator may also have a specific application, but it may be used to initiate, terminate, or route communication around the network. The PAN coordinator is typically the primary controller of the PAN. All devices operating on a network of either topology have unique addresses, referred to as extended addresses. A device may use either the extended address for direct communication within the PAN or the short address that was allocated by the PAN coordinator when the device associated.

In the star topology example 110 of FIG. 1, FFD 111 may establish its own network and become the PAN coordinator after it is activated. All star networks operate independently from all other star networks currently in operation. This is achieved by choosing a PAN identifier that is not currently used by any other network within the radio communications range. Once the PAN identifier is chosen, the PAN coordinator allows other devices, potentially both FFDs and RFDs, to join its network. A higher layer can use the procedures described in IEEE Std 802.15.4e to form a star network.

The PAN coordinator 111 will often be powered by home or office wiring, while the other devices will most likely be battery powered. Applications that benefit from a star topology include home automation, personal computer (PC) peripherals, games, and personal health care, for example.

The peer-to-peer topology 120 also has a PAN coordinator 121, which may also be referred to as the root node; however, a peer-to-peer topology differs from the star topology in that any leaf device is able to communicate with any other leaf device as long as they are in range of one another. Peer-to-peer topology allows more complex network formations to be implemented, such as mesh networking topology.

One device, such as FFD 121, may be nominated as the PAN coordinator, for example, by virtue of being the first device to communicate on the channel. Further network structures may be constructed out of the peer-to-peer topology, and it is possible to impose topological restrictions on the formation of the network. Each independent PAN selects a unique identifier. This PAN identifier allows communication between devices within a network using short addresses and enables transmissions between devices across independent networks.

Applications such as industrial control and monitoring, wireless sensor networks, asset and inventory tracking, intelligent agriculture, and security may benefit from a peer-to-peer network topology. A peer-to-peer network allows multiple hops to route messages from any device to any other device on the network. Such functions can be added at the higher layer, but they are not part of the 802.15.4e standard.

Figure 2A:
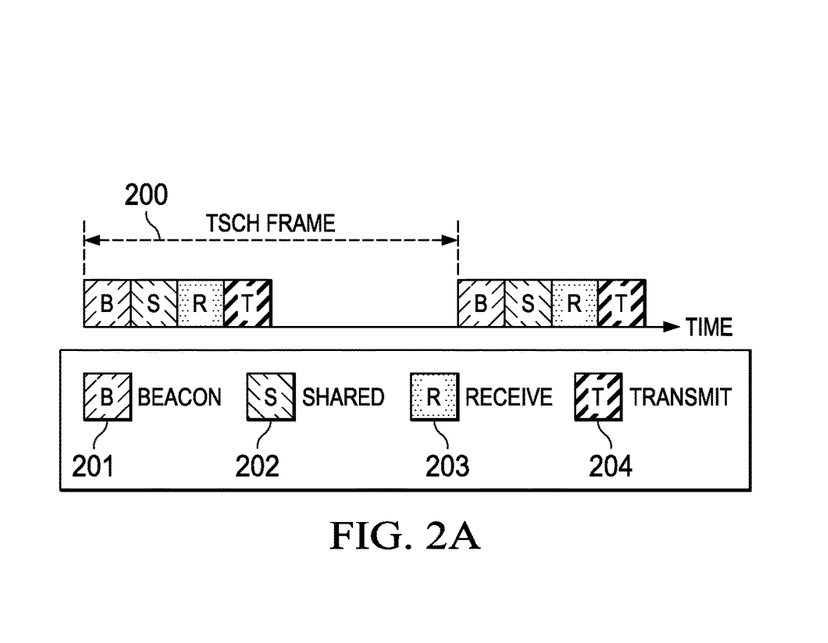
FIGS. 2A and 2B are simple timing diagrams illustrating operation of TSCH.

FIG. 2A is a simple timing diagram illustrating operation of TSCH. For devices using the optional TSCH mode, initial synchronization is performed by the use of enhanced beacons, and synchronization is maintained by slotted communication with other devices in the PAN.

In a TSCH PAN, the IEEE 802.15.4 concept of a superframe is replaced with a slotframe, such as illustrated at 200. As used herein, the terms "slotframe" and "frame" are interchangeable. The slotframe also contains defined periods of communications between peers that may be either CSMA-CA (carrier sense multiple access w/collision avoidance) or guaranteed, but the slotframe automatically repeats based on the participating devices' shared notion of time, and does not require beacons to initiate communications. Example slot periods are illustrated for a beacon 201, shared slot 202, receive slot 203, and transmit slot 204.

Unlike the superframe in IEEE 802.15.4, slotframes and a device's assigned timeslot(s) within the slotframe may initially be communicated by a beacon packet, but are typically configured by a higher layer. Because all devices share common time and channel information, devices may hop over the entire channel space to minimize the negative effects of multipath fading and interference, and do so in a slotted way to avoid collisions, minimizing the need for retransmissions In order to ensure that it remains synchronized with the TSCH PAN, a network device may ensure that it communicates with each of its timekeeping neighbors at least once per Keep Alive period. The keep alive period is not defined in the current version of the IEEE 802.15.4e standard; however, based on the crystal clock accuracy, it is typically defined to be guard_time/(2*clock_accuracy), where the guard time may be defined by system designer, for example. Typically, a beacon packet may be transmitted periodically by the PAN coordinator and be for network timing synchronization. If a network device has not sent a packet to its time source neighbor within this interval, it may send any empty acknowledged MAC frame and use the acknowledgement frame to perform acknowledgement based synchronization.

Referring still to FIG. 2A, TSCH the protocol includes a sequence of frames 200 and each frame consists of some n number of slots. Out of n slots, there is at least one beacon 201 and a shared slot 202. The beacon slot is used by a PAN coordinator device, as described above, to transmit a beacon packet that includes a transmit/receive schedule for the other nodes in the network. The beacon is also used for time synchronization purposes. The shared slot is a contention slot used for new nodes to join the network as well as any other network maintenance related packets. Apart from the beacon and shared slot, according to the schedule sent out by the scheduler, the frame may also include a receive slot 203 and a transmit slot 204 allocated to a particular device.

Figure 2B:
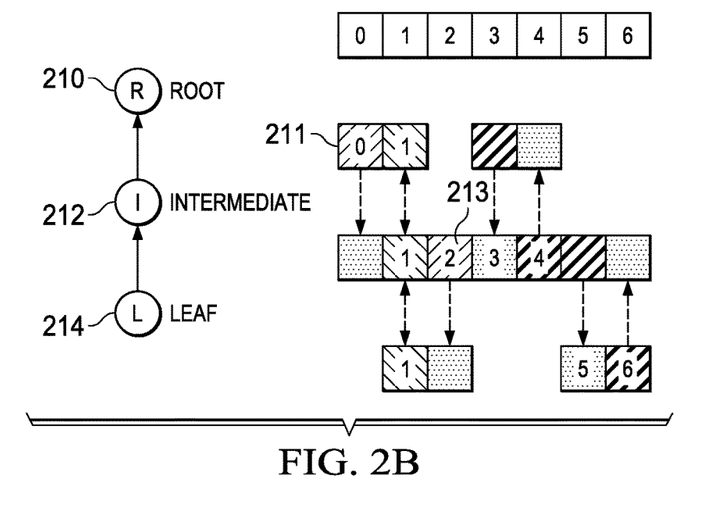

FIG. 2B illustrates operation of an example network that may include a root node 210, an intermediate node 212, and a leaf node 214. A typical network may include many more intermediate and leaf nodes than shown here. In this example, root node 210 may send a beacon packet 211 on time slot 0, which is received by intermediate node 212 and rebroadcast 213 during time slot 2 to leaf node 214. In this manner, a timing beacon may be propagated throughout a large network. In a similar manner, a leaf node may send and receive packets to and from an intermediate node, which may then forward the packets to the root node.

Channel Hopping

IEEE 802.15.4e networks may support channel hopping where permitted or when required using any multichannel PHY (physical transport layer). The general scheme defined by the IEEE 805.15.4e standard will be described briefly herein; further details are available in the IEEE Std 802.15.4e document.

Hopping sequences may be of arbitrary length L up to 511 elements, and cover all or a subset of channels available to the PHY. Devices may hop in a slotted mode (e.g., TSCH or DSME (Deterministic Synchronized Multichannel Extension)) or in an unslotted mode. Hopping sequences may be referred to by an ID, macHoppingSequenceID, with ID=0 denoting the default sequence for a particular PHY (or PHY configuration if the PHY supports more than one channel list).

Table 1 illustrates an algorithm to generate a default frequency hopping sequence for IEEE 802.15.4e. The default sequence is a pseudo-random list of all of the channels available to the PHY. The mechanism to generate the default sequence is based on a 1×L array, referred to as a "shuffle array" M[L], where L=511 is the length of the hopping sequence. The contents of this shuffle array are equivalent to the outputs of a 9-bit linear feedback shift register (LFSR) with polynomial $x^9+x^5+1$ and a starting seed of 255. Each LFSR output is modulo the hopping sequence length L, so that each entry of SHUFFLE is between 0 and L−1, inclusive. A second 1×L Channels array, also referred to as the "FHS array", is initially populated with a repeating monotonically increasing list of channels available to the PHY, as illustrated by lines 3-5 in Table 1. The FHS array is then shuffled using the shuffle array in the algorithm illustrated by lines 6-10 in Table 1. In Table 1, the Index_to_Channel function simply transfers the channel index into a channel value, % indicates modular division, and $Channel_N$ is the number N of channels available on the PHY. In 802.15.4e, N is typically sixteen.

TABLE 1

Algorithm to generate IEEE 802.15.4e default Frequency Hopping Sequence

| | |
|---|---|
| 1 | Given a Shuffle Array, M[511] |
| 2 | FHS_Length = 511 |
| 3 | For (int i = 0; i < FHS_Length; i++){ |
| 4 |     FHS[i] = Index_to_Channel(i % $Channel_N$); |
| 5 | } |
| 6 | For(int i=0; i<FHS_Length; i++){ |
| 7 |     Temp = FHS[i] |
| 8 |     FHS[i] = FHS[M[i]]; |
| 9 |     FHS[M[i]]=Temp; |
| 10 | } |

Elements in the FHS array may wind up being swapped multiple times in this process. The default channel hopping sequence is equivalent to the shuffled FHS array. For cases where hopping sequence length L is less than or equal to the number of channels available to the PHY, some channels available to the PHY may be excluded from the array. The selection of channels is implementation-specific. The selection of channels may be a subset of available PHY channels. Channels may be used multiple times in the hopping sequence.

The use of other sequences (macHoppingSequenceID>0) may be defined by a particular channel hopping system. The Hopping Sequence List for a macHoppingSequenceID>0 may be longer or shorter than the default sequence and may be specified algorithmically or set as a predefined channel list. Two hopping devices cannot communicate unless their PHYs support the same number of channels, and they either use the default hopping sequence or agree upon the hopping sequence being used, either through carrying this information in an enhanced beacon frame, or through pre-configuration, for example.

Figure 3:
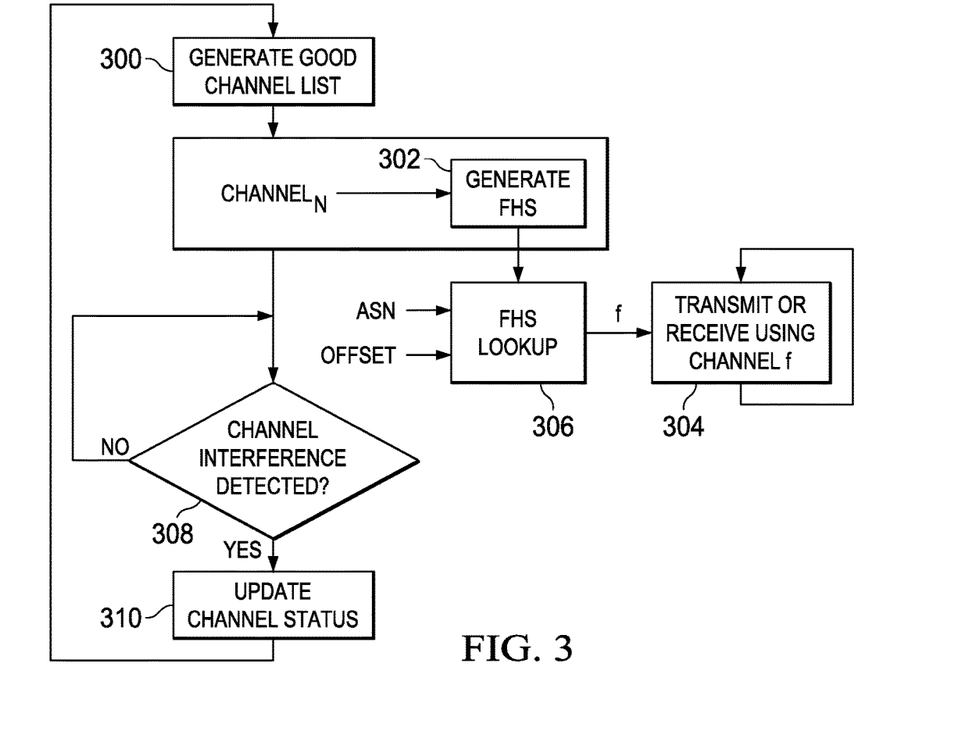
FIG. 3 is a flow chart illustrating a computationally intensive technique for frequency hopping channel selection with channel black listing.

FIG. 3 is a flow chart illustrating a computationally intensive technique for frequency hopping channel selection with channel black listing. Initially, a list of all available channels may be generated 300 and a FHS may be generated 302 using the total channel-number $Channel_N$, as described above for an IEEE 802.15.4e network. This value is sixteen in IEEE 802.15.4e networks. Each time the device wants to transmit or receive 304, it may use the current Absolute Slot Number (ASN) and a Channel-Offset (Offset) to lookup 306 a channel f in the FHS. Equation (1) may be used to select 306 a channel f, where % indicates a modular operation.

$$\text{Channel } f = FHS[(ASN+Offset)\%FHS_{Length}] \quad (1)$$

ASN represents the current time slot number, which is used for synchronization, while Channel-Offset is a number that is assigned to the device/devices by the root node.

Channel-Offset can avoid heavy collisions between two interfering links by assigning different Channel-Offset to these links.

When channel interference is detected 308, a channel status value may be updated 310 to reflect the current good channels and black-listed channels. The channel status value may then be used as a channel black list. Channel status may be maintained by a sixteen bit status word, in which a "1" indicates a good channel and a "0" indicates a black-listed channel, for example. The channel status may then be broadcast to all nodes in the network. A revised good channel list is then generated 300 by each device in the network based on the current channel status. This then requires that each device in the network generate 302 a revised FHS based on the revised good channel list and number of channels N.

As mentioned above, generating a new FHS requires computation effort that is proportional to L, where L is the length of the FHS. Since L is usually a large number to ensure randomness (L=511 in default FHS), the regeneration of FHS each time the channel black list is changed introduces large computational overhead in each sensor device in the network.

A mechanism is proposed by P. Du to avoid the FHS regeneration overhead by selecting channels randomly when the selected channel in FHS is not a good channel (i.e., the channel is on the blacklist). Every time the device wants to transmit or receive, a channel is selected as described above with regard to FIG. 3. If the selected channel, f, is a good channel, then channel f will be used. On the other hand, if the selected channel is not a good channel, a channel remapping will be carried out. The channel remapping mechanism can be simply implemented using equation (2) to generate an index into a list of good channels. Since the randomness of equation (2) is based on ASN, which represents the current time, this mechanism is referred to as time-random channel-remapping. Time-random channel-remapping is simple, always uses good channels, and avoids the FHS regeneration overhead.

$$\text{Index}=(\text{ASN}+\text{Offset})\%\text{Channel}_N \tag{2}$$

However, time-random channel-remapping breaks the good property of the default FHS. The default FHS is designed in a way that the probability of interfering for two links is small when links use different Channel-Offsets. Time-random channel-remapping randomly changes certain channels in the default FHS. This may result in a new FHS that has high hamming auto-correlation, which implies high interference probability between devices [1]. Since the main point of Blacklisting is to avoid interference, time-random channel-remapping may decrease the performance of TSCH with blacklisting.

Figure 4:
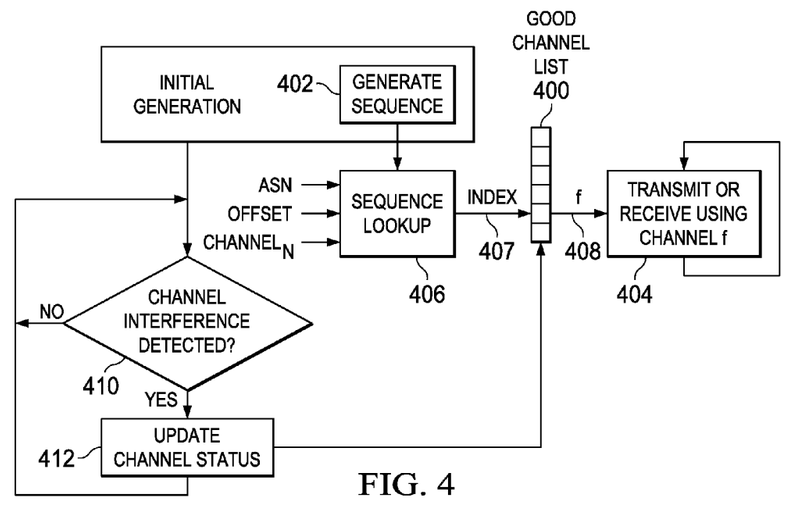
FIG. 4 is a flow chart illustrating a computationally efficient technique for channel selection with channel blacklisting to reduce power consumption.

FIG. 4 is a flow chart illustrating a computationally efficient technique for channel selection with channel blacklisting to reduce power consumption. This technique avoids the overhead of regenerating the FHS by each leaf node each time the channel-number changes in response to blacklisting while still maintaining the desirable random properties of the default FHS to minimize interference between links. In this technique, channels are selected with different channel-numbers using only one initially generated generic sequence.

Initially, instead of generating a FHS that contains the actual channel numbers, as was described above with respect to FIG. 3, a generic sequence is generated 402 as illustrated in FIG. 4. Note that in the FHS described above, each value in the sequence represents a channel. Thus, each device needs to know the actual channel-numbers in order to generate a FHS. On the other hand, the generic sequence generated for this low computation technique is not necessarily a FHS. The value of the sequence may be arbitrary values, and the channel-numbers do not need to be known when generating the sequence.

A "good channel" list may be generated 400 by each node in the network in which blacklisted channels are excluded, in response to the current channel status 412. Thus, the length of the good channel list will change based on the number N of good channels.

Each time the device wants to transmit or receive 404, a sequence lookup 406 may be performed to generate a channel index 407 that is determined by the sequence, the current slot-number, ASN (absolute slot number), and Channel-Offset using equation (3). In stark difference from time-random channel-remapping, the randomness of each selected channel "f" 408 is based on a value in the sequence 402.

$$\text{Index}=(\text{Sequence}[(\text{ASN}+\text{Offset})\%\text{Sequence\_Length}])\%\text{Channel}_N \tag{3}$$

Channel interference may be detected 410 using known or later developed techniques. For example, a channel quality estimator based on noise floor readings may be used. In designated noise floor (NF) timeslots, a noise floor listening process may be invoked. Channels may be probed in a pseudo-random manner. Collected noise readings may be passed to a channel quality estimation logic function which updates channel quality records to reflect the desirability of channels. Blacklisting subsequently composes the blacklist which is the collection of undesirable channels to be excluded from the hopping sequence. Channel interference may be detected by the root node in the network, or by one or more of the leaf nodes, for example. A channel quality status value may then be shared across the network by the root node, for example, and stored 412 on each leaf node in the network. Alternatively, one or more leaf nodes may exchange channel quality status information to arrive at a shared blacklist 412, for example. Each time the channel status is changed, each node updates its good channel list 400.

Using the mechanism of FIG. 4, there is no need to regenerate a FHS each time the channel-number changes 412 in response to blacklisting or for any other reason. Furthermore, unlike time-random channel-remapping, this mechanism provides sufficient randomness to produce a small probability of interference among channel hopping devices.

In some embodiments described below in more detail, for example, a sequence may be initially generated 402 that may mimic the IEEE 802.15.4e default FHS, which has close-to-optimal interfering probability among all possible channel-numbers in 802.15.4e networks.

Generating a Generic Sequence that Mimics the 802.15.4e Default FHS

Table 2 illustrates an algorithm to generate a generic sequence 402 that mimics the IEEE 802.15.4e default frequency hopping sequence as described above with reference to Table 1. In this case, a shuffle array M[L] is formed as described for Table 1, where L is the length of the generic sequence. The contents of this shuffle array are equivalent to the outputs of a 9-bit linear feedback shift register (LFSR) with polynomial $x^9+x^5+1$ and a starting seed of 255. Each LFSR output is modulo hopping sequence length L, so that each entry of SHUFFLE is between 0 and L−1, inclusive. A second 1×L Channels array, also referred to as the "Sequence array", is initially populated with monotonically increasing numbers, as illustrated by lines 3-5 in Table 2. The Sequence array is then shuffled using the shuffle array with the algorithm illustrated by lines 6-10 in Table 2.

TABLE 2

Algorithm to generate a Generic Sequence that mimics 802.15.4e Default FHS

| 1 | Given a Shuffle Array, M[511] |
| 2 | Sequence_Length = 511 |
| 3 | For (int i = 0; i < Sequence_Length; i++){ |
| 4 | Sequence[i] = i; |
| 5 | } |
| 6 | For(int i=0; i<Sequence_Length; i++){ |
| 7 | Temp = Sequence[i] |
| 8 | Sequence[i] = Sequence[M[i]]; |
| 9 | Sequence[M[i]]=Temp; |
| 10 | } |

Comparing Table 1 and Table 2, the only difference between FHS and Sequence is in line 4. Since the swapping mechanism from line 6 to 10 does not relate to the value of sequence content, the value of FHS[k] is given by equation (4).

$$FHS[k] = \text{Index\_to\_Channel}(Sequence[k] \% Channel_N), \text{ for } 0 \le k \le 511 \quad (4)$$

Thus, the channel selected by the default FHS is given by equation (5)

$$\begin{aligned} Channel &= FHS[(ASN + \text{Offset})\% \text{ FHS\_Length}] \quad (5) \\ &= FHS[(ASN + \text{Offset})\% \ 511] \\ &= \text{Index\_to\_Channel} \\ &\quad (Sequence[(ASN + \text{Offset})\% \ 511]\% \ Channel_N) \\ &= \text{Index\_to\_Channel} \\ &\quad (Sequence[(ASN + \text{Offset})\% \ Sequench\_Length] \\ &\quad \% \ Channel_N) \end{aligned}$$

Note that, the last line of equation (5) is the channel selected by the disclosed mechanism as illustrated in FIG. 4 using equation (3) and a generic Sequence generated according to Table 2. Thus, the channel selected by equation (3) using Sequence generated according to Table 2 is the same as the channel selected by equation (1) using FHS generated according to Table 1. That is, the FHSs generated by according to FIG. 4 using and equation (3) and the sequence generated according to Table 2 are the same as the default FHS defined in 802.15.4e.

Since the 802.15.4e default FHS has close-to-optimal interference probability, the disclosed computationally efficient mechanism may also provide close-to-optimal interference probability among all possible channel-numbers in 802.15.4e networks. Thus, the good property of the default FHS may be maintained by using a proper Sequence with equation (3).

Figure 5:
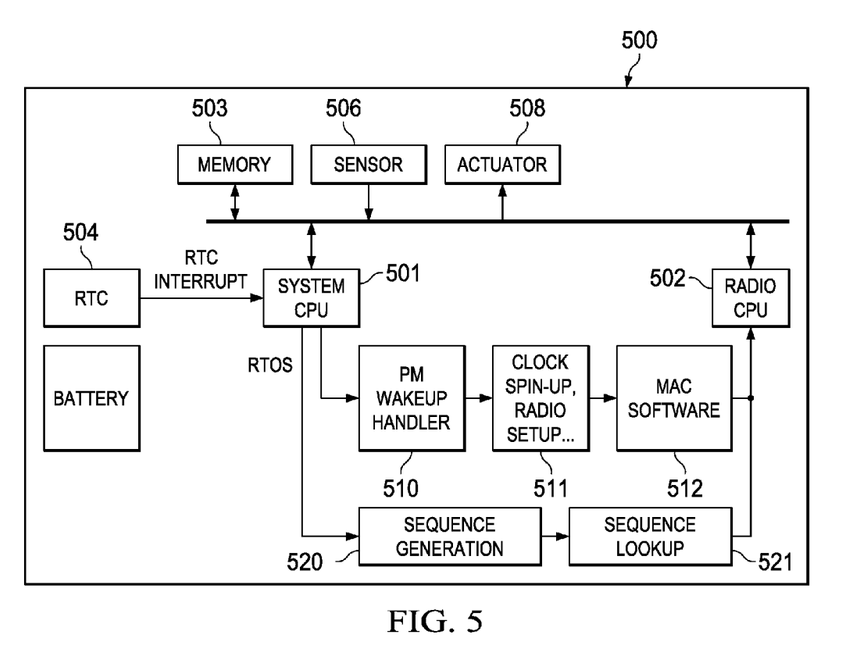
FIG. 5 is a block diagram of an example TSCH device.

FIG. 5 is a block diagram of an example TSCH device 500 that may include a system processor (CPU) 501 that may include memory for holding instructions and data. Nonvolatile memory 503 may store software program instructions that may be executed by CPU 501 and/or CPU 502 to perform some or all of the network functions described herein, for example. A radio CPU 502 may be coupled to the system processor and be configured to control a transceiver configured to transmit and receive data using the wireless TSCH protocol described herein. One or more sensors 506 and/or one or more actuator circuits 508 may be included in device 500 for interacting with the physical world. A real time clock (RTC) 504 may generate periodic interrupts that are provided to processor 501.

The device wakeup may be initiated by an RTC interrupt. A RTC interrupt handler executed in software by processor 501 may then pass control to the power management (PM) wakeup handler 510 which performs the necessary state transition steps 511 such as clock spin, radio setup and so on. From there on, the MAC software 512 typically takes control to issue the necessary "command" to the radio CPU 502. The typical radio command is transmit, receive, or idle.

As described above in more detail, sequence generation logic 520 may be performed initially, such as when device 500 joins a network, and the resulting generic sequence may be stored in memory 503 for repeated use. Alternatively, a generic sequence may be installed in non-volatile memory 503 when device 500 is produced, for example.

In some embodiments, just a portion of the sequence may be stored in memory 503 if the memory does not have enough capacity to store the entire sequence. In this case, the remainder of the sequence may be calculated on the fly when needed to perform a sequence lookup. For example, consider a sequence with length L. If the whole sequence is saved, the required memory is O(L), and the computation complexity of sequence lookup is O(1). On the other hand, if O(L) memory is not affordable, then a subset of O(L) may be saved. For example, a subset of $\sqrt{L}$ of the sequence elements may be saved and the other sequence elements may be computed on the fly using the saved elements. For example, consider the sequence that is equal to the outputs of a 9-bit linear feedback shift register (LFSR) with polynomial $x^9 + x^5 + 1$ with L=511. The $1^{st}$, $23^{rd}$, $45^{th}$, ... $507^{th}$ elements of the sequence may be saved. Other sequence elements can be calculated from the saved sequence elements with smaller index using LFSR. For example, the $27^{th}$ element may be calculated by setting the LFSR initial value to the $23^{rd}$ element and repeating the shifting operation 4 times. The required memory is $O(\sqrt{L})$, and the computation complexity of sequence lookup is $O(\sqrt{L})$.

Sequence lookup logic 521 may be activated each time device 500 needs to transmit or receive in order to select a channel for use by radio 502 in a frequency hopping manner as described in more detail above.

In this example, functions 510-512 and 520-521 may be performed by software executed on CPU 501.

Referring still to FIG. 5, device 500 may be embodied as a CC26xx SimpleLink™ Multistandard Wireless MCU integrated circuit (IC) available from Texas Instruments, for example. The CC26xx family of ultralow-power microcontrollers includes multiple devices featuring ultralow power CPU and different peripherals targeted for various applications. For example, the CC2650 contains a 32-bit ARM Cortex-M3 running at 48-MHz as the main processor and a rich peripheral feature set, including a unique ultra-low power sensor controller, ideal for interfacing external sensors and/or collecting analog and digital data autonomously while the rest of the system is in sleep mode. The CC2650 is well suited for applications within a whole range of products including industrial, consumer electronics, and medical. The Bluetooth Low Energy controller and the IEEE 802.15.4 MAC are embedded into ROM and are partly running on a separate ARM Cortex®-M0 processor. This architecture improves overall system performance and power consumption and frees up flash memory for the application. Peripherals may include 12-bit ND converter, 16-channel comparator with voltage reference generation and hysteresis capabilities, interfaces for, SPI, Microwire and UART protocols, internal DMA, real-time clock, multiple 16/32-bit timers, and more. A detailed description of the CC2650 is provided in publication SWRS158, "CC2650 SimpleLink™ Multistandard Wireless MCU," February 2015, and is incorporated by reference herein.

Each sensor device 500 may be configured to monitor one or more environmental parameters within or around a residence or commercial building, for example. Depending on the capability of the sensor, various types of parameters may be monitored, such as: temperature, pressure in pipes or ducts, flow rate in pipes or ducts, barometric pressure in a room, vibration or other seismic motion, motion within a room or other region, light level, humidity, etc. Each sensor device 500 is equipped with a wireless transmitter that enables it to transmit collected environmental data to a higher level controller in the hierarchy of a network over a wireless link 104, as shown in FIG. 1, for example. Typically, each sensor may also receive commands or instructions over the wireless link from the higher level controller.

Sensor devices 500 may be organized into groups. Grouping may be based on various factors, such as: physical location within a building, type of data being collected by the sensor, etc. Each sensor in a group may wirelessly transmit collected environmental data to a higher level controller assigned to that group, using a wireless signal. For example, the resource system may be the heating, ventilation, and air conditioning (HVAC) system for a residence or commercial building. In response to temperature information gathered by sensors 500, various dampers may be adjusted and cooling or heating operation of the HVAC system may be increased or decreased in order to maintain optimum temperature in each room of the building. In another example, a resource system may be a lighting system for a residence or commercial building. In response to outside light levels, interior light levels, and presence or absence of people in a room as detected by sensor devices 500, lighting to each room may be adjusted.

As described above, Time Slotted Channel Hopping may be used to enhance robustness of low power devices against external interferences. Embodiments of the present disclosure may reduce the power consumption overhead for performing time synchronized channel hopping considerably. It may be especially useful in applications where low-power consumption and robustness is critical for operation.

REFERENCES

[1] Abraham Lempel and Haim Greenberger, "Families of Sequences with Optimal Hamming Correlation Properties," IEEE Transactions on Information Theory, January 1974

OTHER EMBODIMENTS

While the invention has been described with reference to illustrative embodiments, this description is not intended to be construed in a limiting sense. Various other embodiments of the invention will be apparent to persons skilled in the art upon reference to this description. For example, while the disclosure was explained in the context of IEEE 802.15.4e, the concepts described herein may be applied to other transmission protocols in order to reduce power consumption.

Embodiments of the computationally efficient frequency selection technique may use the generic sequence illustrated in Table 2. Other embodiments may use a simple or complex pseudo-random number sequence. Other embodiments may use generic sequences that may be a sequence of increasing values, decreasing values, or sequences defined by various mathematical functions, for example.

While a sixteen bit channel status word was described herein for indicating which channels of a set of sixteen channels are good and which channels are bad (subject to heavy interference), other embodiments may use other data structures to convey a list of good channels or a list of blacklisted channels. For example, a node may broadcast a data packet to other nodes in the network with channel number of a channel each time the node decides a channel should be blacklisted. Similarly, the node may broadcast a data packet to other nodes in the network with channel number of a channel each time the node decides a channel should be removed from the blacklist.

While the embodiments described herein used a sequence length of 511 with sixteen frequency channels, other embodiments may use longer or shorter sequences with a larger or smaller number of frequency channels, for example.

Embodiments of the device nodes and methods described herein may be provided on any of several types of systems: digital signal processors (DSPs), general purpose programmable processors, application specific circuits, or systems on a chip (SoC) such as combinations of a DSP and a reduced instruction set (RISC) processor together with various specialized sensors and/or actuators. Analog-to-digital converters and digital-to-analog converters may provide coupling to the real world, modulators and demodulators (plus antennas for air interfaces) may provide coupling for waveform reception, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a device in a network using a channel hopping communication protocol, the method comprising:

generating a numerical sequence of values having a length L and storing at least a portion of the numerical sequence of values in storage logic on the device, wherein each of the values of the numerical sequence is associated with a corresponding sequence index value and wherein the values of the numerical sequence do not represent channel numbers of a plurality of channels of the network;

receiving a channel offset value for a communication link between the device and a second device in the network;

recording a channel status indicating which ones of the plurality of channels are good to use for the channel hopping communication protocol;

generating a good channel list having a length N according to the recorded channel status; and selecting a channel from the plurality of channels to use for communication with the second device during each hop by:

using the channel offset value to determine a sequence index value;

using the determined sequence index value to select a sequence value from the numerical sequence having a sequence index value that matches the determined sequence index value;

processing the selected sequence value to determine a channel index value having a value that is less than or equal to N; and using the determined channel index value to select a channel to use from the good channel list.

2. The method of claim 1, in which generating the numerical sequence of values includes:

forming a shuffle array having a length L with values equivalent to an output of a linear feedback shift register with polynomial $x^9+x^5+1$ and a starting seed of 255;

forming a sequence array having a length L with a sequence of values that do not represent channel numbers of the plurality of channels; and shuffling each entry of the sequence array with another entry of the sequence array selected by a corresponding entry value of the shuffle array, wherein the shuffled sequence array is the numerical sequence.

3. The method of claim 1, in which the channel hopping communication protocol uses time slots, and in which determining the sequence index value comprises performing a modulo L operation on the sum of the channel offset value and a current absolute slot number (ASN) value.

4. The method of claim 3, wherein processing the selected sequence value to determine the channel index value comprises performing a modulo N operation on the selected sequence value.

5. The method of claim 1, further including detecting channel interference on one or more of the plurality of channels and updating the channel status to indicate which ones of the plurality of channels have channel interference.

6. The method of claim 1, further including transmitting a data packet to the second device using the selected channel.

7. The method of claim 6, further including recording a revised channel status and generating a revised good channel list; and wherein selecting a channel from the plurality of channels uses the unrevised stored numerical sequence.

8. The method of claim 7, further including repeating the steps of recording a revised channel status, generating a revised good channel list, and transmitting a data packet using the selected channel during each hop while using the same unrevised stored numerical sequence for each repetition.

9. The method of claim 1, further including incrementally generating a sequence value by processing a stored one of the at least a portion of the numerical sequence.

10. A method for operating a device in a network using a channel hopping communication protocol, the method comprising:

generating and storing at least a portion of a sequence of length L of pseudo-random numbers, each having a corresponding sequence index value;

generating a list of length N of good channels selected from a plurality of channels in accordance with a channel blacklist status;

selecting one of the good channels from the list of good channels for use by a transceiver for each hop by using a pseudo-random number selected from the sequence of pseudo-random numbers, in which a next pseudo-random number in the sequence of pseudo-random numbers is selected for each hop, wherein selecting one of the good channels for use by the transceiver comprises:

using a channel offset value to determine a sequence index value;

using the determined sequence index value to select a pseudo-random number from the stored sequence of pseudo-random numbers, the selected pseudo-random number having a sequence index value that matches the determined sequence index value;

processing the selected pseudo-random number to determine a channel index value having a value that is less than or equal to N; and using the determined channel index value to select a channel from the good channel list; and revising the list of good channels in response to obtaining a revised channel blacklist status.

11. The method of claim 10, in which generating the sequence of pseudo-random numbers includes:

forming a shuffle array having a length L with values equivalent to an output of a linear feedback shift register with polynomial $x^9+x^5+1$ and a starting seed of 255;

forming a sequence array having a length L with a sequence of values that do not represent channel numbers of the plurality of channels; and shuffling each entry of the sequence array with another entry of the sequence array selected by a corresponding entry value of the shuffle array, wherein the shuffled sequence array is the sequence of pseudo-random numbers.

12. The method of claim 10, further including detecting channel interference on one or more of the plurality of channels and updating the channel blacklist status to indicate which ones of the plurality of channels have channel interference.

13. The method of claim 10, in which the channel hopping communication protocol uses time slots, and in which determining the sequence index value comprises performing a modulo L operation on the sum of the channel offset value and a current absolute slot number (ASN) value.

14. The method of claim 13, in which
processing the selected pseudo-random number to determine the channel index value comprises performing a modulo N operation on the selected pseudo-random number.

15. A network node device comprising:
a transceiver configured to transmit and receive data with other devices in a network using a frequency hopping communication protocol;
a processor controllably coupled to the transceiver; and
storage circuitry coupled to the processor, in which instructions are stored that when executed by the processor cause the device to communicate with another node device in the network by:
generating a sequence of length L of pseudo-random index numbers and storing at least a portion of the sequence in the storage circuitry, each of the pseudo-random numbers in the sequence having a corresponding sequence index value;
generating a list of length N of good channels selected from a plurality of channels in accordance with a channel blacklist status;
selecting one of the good channels from the list of good channels for use by the transceiver for each hop by using a pseudo-random number selected from the sequence of pseudo-random numbers, in which a next pseudo-random number in the sequence of pseudo-random index numbers is selected for each hop, wherein selecting one of the good channels for use by the transceiver comprises:
using a channel offset value to determine a sequence index value;
using the determined sequence index value to select a pseudo-random number from the stored sequence of pseudo-random numbers, the selected pseudo-random number having a sequence index value that matches the determined sequence index value;
processing the selected pseudo-random number to determine a channel index value having a value that is less than or equal to N; and
using the determined channel index value to select a channel from the good channel list; and
revising the list of good channels in response to obtaining a revised channel blacklist status.

16. The device of claim 15, in which generating the sequence of pseudo-random numbers includes:
forming a shuffle array having a length L with values equivalent to an output of a linear feedback shift register with polynomial $x^9+x^5+1$ and a starting seed of 255;
forming a sequence array having a length L with a sequence of values that do not represent channel numbers of the plurality of channels; and
shuffling each entry of the sequence array with another entry of the sequence array selected by a corresponding entry value of the shuffle array, wherein the shuffled sequence array is the sequence of pseudo-random numbers.

17. The device of claim 15, further including detecting channel interference on one or more of the plurality of channels and updating the channel blacklist status to indicate which ones of the plurality of channels have channel interference.

18. The device of claim 15, in which the channel hopping communication protocol uses time slots, and in which determining the sequence index value comprises performing a modulo L operation on the sum of the channel offset value and a current absolute slot number (ASN) value.

19. The device of claim 18, in which
processing the selected pseudo-random number to determine the channel index value comprises performing a modulo N operation on the selected pseudo-random number.

* * * * *